(12) United States Patent
Cetrulo et al.

(10) Patent No.: US 8,790,734 B2
(45) Date of Patent: *Jul. 29, 2014

(54) REDUCED SUGAR CITRUS JUICE BEVERAGE

(71) Applicant: Tropicana Products, Inc., Bradenton, FL (US)

(72) Inventors: Therese Cetrulo, Sarasota, FL (US); Osvaldo Chu, Sarasota, FL (US); Richard N. McArdle, Bradenton, FL (US); Renee Mellican, Bradenton, FL (US); Keith Seaman, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,623

(22) Filed: May 13, 2013

(65) Prior Publication Data

US 2013/0251873 A1    Sep. 26, 2013

Related U.S. Application Data

(63) Continuation of application No. 12/167,678, filed on Jul. 3, 2008, now Pat. No. 8,440,248, which is a continuation of application No. 10/661,179, filed on Sep. 12, 2003, now abandoned.

(51) Int. Cl.
*A23L 2/02*     (2006.01)

(52) U.S. Cl.
USPC ........................................................ 426/599

(58) Field of Classification Search
USPC ........................................................ 426/599
See application file for complete search history.

(56) References Cited

U.S. PATENT DOCUMENTS

| | | |
|---|---|---|
| 4,024,290 A | 5/1977 | Layton |
| 4,093,750 A | 6/1978 | Babayan |
| 4,160,849 A | 7/1979 | Huchette |
| 4,374,865 A | 2/1983 | Stobel |
| 4,388,330 A | 6/1983 | Wobben |
| 4,622,417 A | 11/1986 | Barnett |
| 4,690,827 A * | 9/1987 | Kupper et al. ............... 426/548 |
| 4,818,555 A | 4/1989 | Piotrowski |
| 4,830,870 A | 5/1989 | Davis, Jr. |
| 4,834,990 A | 5/1989 | Amer |
| 4,871,554 A | 10/1989 | Kalala |
| 4,889,739 A * | 12/1989 | Powers et al. ............... 426/599 |
| 4,938,985 A | 7/1990 | Swaine, Jr. |
| 4,946,702 A | 8/1990 | Stipp |
| 4,963,380 A | 10/1990 | Schroeder |
| 4,971,811 A | 11/1990 | Strobel |
| 4,986,994 A | 1/1991 | Baccus, Jr. |
| 4,988,530 A | 1/1991 | Hoersten |
| 4,992,282 A | 2/1991 | Mehansho |
| 5,069,924 A | 12/1991 | Baccus, Jr. |
| 5,073,397 A | 12/1991 | Tarr |
| 5,089,171 A | 2/1992 | Chiu |
| 5,108,774 A | 4/1992 | Mills |
| 5,162,128 A | 11/1992 | Mills |
| 5,194,284 A | 3/1993 | Chiu |
| 5,213,834 A | 5/1993 | Ikeda |
| 5,260,086 A | 11/1993 | Downton |
| 5,374,444 A | 12/1994 | Langner |
| 5,385,748 A | 1/1995 | Bunger |
| 5,403,604 A | 4/1995 | Black, Jr. |
| 5,433,965 A | 7/1995 | Fischer |
| 5,474,793 A | 12/1995 | Meyer |
| 5,500,241 A | 3/1996 | Balasingham |
| 5,811,148 A | 9/1998 | Chiu |
| 5,830,523 A | 11/1998 | Takaichi |
| 5,851,578 A | 12/1998 | Gandhi |
| 5,855,948 A | 1/1999 | Mills |
| 5,939,110 A | 8/1999 | Grassin |
| 6,007,848 A | 12/1999 | Hendrick |
| 6,126,960 A | 10/2000 | Nilsen |
| 6,139,895 A | 10/2000 | Zablocki |
| 6,248,390 B1 | 6/2001 | Stillman |
| 6,383,546 B1 | 5/2002 | Powrie |
| 6,391,864 B1 | 5/2002 | Stone |

(Continued)

FOREIGN PATENT DOCUMENTS

| | | |
|---|---|---|
| CN | 1087490 | 6/1994 |
| EP | 0210695 | 2/1987 |

(Continued)

OTHER PUBLICATIONS

Braverman, J. 1949. Citrus Products. Interscience Publishers, Inc., New York. p. 116.*

(Continued)

*Primary Examiner* — Carolyn Paden
(74) *Attorney, Agent, or Firm* — Banner & Witcoff, Ltd.

(57) ABSTRACT

Citrus juice beverage products and their method of production are formulated to reduce the sugar content of the beverage while the beverage products have sensory, taste, mouth feel and texture characteristics that mimic those of whole citrus juice. Orange juice beverage products are especially preferred. The beverage products have a relatively low Brix, on the order of between about 7 and about 8 Brix. Also included in the beverage products is a sweetener which does not add a significant caloric load to the beverage product. A sinking pulp added to the beverage product in an amount to achieve texture and other sensory characteristics of a whole juice.

14 Claims, No Drawings

(56) References Cited

U.S. PATENT DOCUMENTS

| | | |
|---|---|---|
| 6,399,142 B1 | 6/2002 | Silver |
| 6,429,190 B1 | 8/2002 | Portman |
| 6,506,427 B1 | 1/2003 | Garti |
| 7,029,717 B1 * | 4/2006 | Ojima et al. ........... 426/548 |
| 7,175,866 B2 | 2/2007 | Parshall |
| 7,186,433 B2 | 3/2007 | Serpelloni |
| 7,579,032 B2 | 8/2009 | Lee |
| 8,440,248 B2 * | 5/2013 | Cetrulo et al. ........... 426/599 |
| 2001/0053404 A1 | 12/2001 | Powrie |
| 2002/0110632 A1 | 8/2002 | Nunes |
| 2002/0122847 A1 | 9/2002 | Nunes |
| 2002/0136802 A1 | 9/2002 | Mechansho |
| 2002/0192350 A1 | 12/2002 | Hynes |
| 2002/0197371 A1 | 12/2002 | Lee |
| 2003/0008057 A1 | 1/2003 | Hynes |
| 2003/0035880 A1 | 2/2003 | Heisey |
| 2004/0115329 A1 | 6/2004 | Tamiya |
| 2005/0142271 A1 | 6/2005 | Ojima |

FOREIGN PATENT DOCUMENTS

| | | |
|---|---|---|
| EP | 0296144 | 12/1988 |
| WO | 8905101 | 6/1989 |
| WO | 9111920 | 8/1991 |
| WO | 9307766 | 4/1993 |
| WO | 9930576 | 6/1999 |
| WO | 0057726 | 10/2000 |
| WO | 03003860 | 1/2003 |

OTHER PUBLICATIONS

Braverman, J. 1949, Citrus Products, Interscience Publishers, Inc., New York, p. 116.

CA Application No. 2,537,713 Office Action dated Jan. 28, 2013.

* cited by examiner

REDUCED SUGAR CITRUS JUICE BEVERAGE

CROSS-REFERENCE TO RELATED APPLICATIONS

This application is a continuation of U.S. application Ser. No. 12/167,678 filed Jul. 3, 2008, now U.S. Pat. No. 8,440,248, which is a continuation of U.S. application Ser. No. 10/661,179 filed on Sep. 12, 2003, now abandoned, the disclosure of which is expressly incorporated herein by reference.

FIELD OF THE INVENTION

This invention relates to citrus juice products which have reduced calorie amounts due primarily to having lower sugar contents when compared with whole like citrus juices. These reduced calorie beverages exhibit texture, mouth feel, taste and sensory characteristics that are on par with such characteristics of whole juices. More particularly, the invention is useful in the field of orange juice beverages which emulate whole orange juices. Citrus juice insoluble solids, or sinking solids are incorporated into a reduced sugar citrus juice to thereby greatly improve its characteristics without adding substantial levels of sugar. Citrus juice products are prepared that have reduced sugar and increased insoluble solids.

DESCRIPTION OF THE RELATED ART

It has heretofore been proposed to prepare fruit juice containing so-called diet beverages. Included are those which incorporate artificial sweeteners and increased background pulp volumes which are said to reduce unpleasant aftertaste characteristics of the artificial sweeteners.

It is generally known that aroma and flavor components tend to be present in sinking solids or insoluble solids, often referred to as sinking pulp, while other compounds tend to be found more extensively in the liquid phase or serum portion of the juice. For example, early on it was suggested that orange oil existed as an adsorbed layer on the sinking pulp of orange juice. Blair et al., "Exploratory Experiments To Identify Chemical Reactions Causing Flavor Deterioration During Storage Of Canned Orange Juice, I. Incompatibility of Peel-Oil Constituence With the Acid Juice", Journal of Food Research, 17, 235 (1952). Others observed that oil was found primarily in the pulp of orange juice. Scott et al., "Composition of Orange Juice Cloud", Journal of Food Science, 30, 833 (1965); and Peleg et al., "Production Of Frozen Orange Juice Concentrate From Centrifugally Separated Serum And Pulp", Journal of Food Science, 35, 649 (1970).

Radford et al., "Distribution Of Volatile Compounds Between The Pulp And Serum Of Some Fruit Juices", Journal of Agricultural Food Chemistry, Volume 22, Number 6 (1974) made several evaluations regarding volatile flavor compounds of orange juice. This article observed that 98% of the limonene in an orange juice sample was recovered from the pulp phase, while only 2% was recovered from the serum phase. Other hydrocarbons such as alpha-pinene, sabinene, mycrene, and valencene were found almost exclusively in the pulp phase, whereas esters, alcohols, and aldehydes were found almost exclusively in the serum phase.

While the art generally has noted differences in the make-up of pulp or solids phases of orange juices on the one hand and the make-up of liquid or serum phases of orange juices on the other hand, recognition of these overall differences has not led to significant direct improvement of actual orange juice products.

One challenge facing the citrus juice industry is the problem of the caloric content of orange juices, grapefruit juices and the like. As awareness of the nutritional benefits of consuming citrus fruits has increased, so has the demand for such products. Citrus is an extremely valuable source of nutrition, and has been recognized to aid in the treatment and prevention of disease. Consequently, it is widely believed that the regular consumption of citrus is a beneficial, if not essential, part of maintaining one's health. However, some individuals do not consume more beneficial quantities of citrus juices because of their perception that they are high in calories and sugars.

There is accordingly a need for approaches which will allow the production of citrus juice beverages which retain nutritional benefits in formulations which are reduced in calories and sugars when compared with whole citrus juices of the same types.

Needs such as these are successfully addressed by the present invention. An important element in achieving the objectives of the present invention is an appreciation that citrus juices having relatively low Brix levels can be transformed into low calorie citrus juice beverages without raising the Brix levels to those of whole juices by an approach which nevertheless mimics the texture and sensory and taste and mouth feel characteristics of a whole juice having traditional Brix levels.

SUMMARY OF THE INVENTION

In accordance with the present invention, a citrus juice beverage is prepared by combining a citrus juice source having a low Brix value, and thus a low sugar content, with added sinking pulp (or bottom pulp) and a sweetener which increases the perceived sweetness sensory characteristic of the juice beverage without significantly increasing the caloric content of the beverage. Such citrus juice beverage will have the sensory and texture attributes comparable to those of a whole citrus juice having a Brix level of at least about 9° Brix when grapefruit juice or at least about 10° Brix when orange juice. In one embodiment, a calcium component also is added which not only provides a well-recognized nutritional and health benefit but also aids in developing desired sensory, taste, mouth feel and texture characteristics that emulate such properties of whole, full-Brix citrus juice.

A general aspect or object of the present invention is to provide an improved citrus juice beverage which has a relatively low caloric content while exhibiting a mouth feel and taste profile very similar to 100% citrus juice, and method of its production.

Another aspect or object of the present invention is to provide an improved product and method of producing same which prepares and/or utilizes orange juice of reduced Brix and thus of reduced soluble solids, primarily sugars, and transforms same into a unique whole-juice mimicking orange juice beverage.

Another aspect or object of this invention is an improved method and product whereby inferior orange juice resources can be used to prepare significantly improved orange juice beverages by combining with beneficial citrus sinking pulp resources.

Another aspect or object of the present invention is to provide an improved method and product which involves diluting mature whole juice, full-Brix citrus sources so as to reduce their caloric content while combining same with citrus sinking pulp resources and non-caloric or low-caloric sweetener sources to prepare a reduced-calorie juice beverage having sensory, taste, texture and mouth feel properties which exceed those of otherwise prepared reduced-calorie citrus beverages.

Another aspect or object of the present invention is to provide a reduced-calorie citrus juice beverage containing calcium which exhibits generally appreciated nutritional and health benefits while also improving the characteristics of the juice beverage being prepared to more closely mimic whole, full-calorie citrus juice.

Another aspect or object of this invention is an improved method and product by which a non-nutritive sweetener helps to increase sweetness of a citrus beverage but which does not bring to the beverage an undesirable or unpleasant aftertaste to be otherwise addressed by the beverage system.

Another aspect or object of the invention is an improved method and product which allows for the use of stored pulp byproducts to be used as a beverage enhancement component.

Another aspect or object of this invention is to incorporate tocopherol sources for enhanced juice product properties of a reduced-calorie citrus juice beverage.

Other aspects, objects and advantages of the present invention will be understood from the following description according to preferred embodiments of the present invention which are understood to be disclosed in various combinations of features as are evident from features noted herein.

DESCRIPTION OF THE PREFERRED EMBODIMENTS

Starting materials for the invention include whole citrus juice sources, citrus sinking or bottom pulp sources and a sweetener which does not add significant calories to the beverage. Depending upon the citrus juice source, water or other suitable non-caloric or low-caloric diluent is included. Other beverage ingredients can be added, including calcium sources, nutrients and other suitable beverage additives.

With further reference to the citrus juice source and the pulp source, the present disclosure discusses primarily orange juice as the citrus source, although it will be understood that other citrus sources can be suitable depending upon the particular product being prepared. Orange juice contains a cloud suspension that contributes to the color, flavor, aroma and turbidity of the juice. This cloud is comprised of membranes, oil droplets, flavonoid crystals, chromatophores, and cell wall fragments of protein, pectin, cellulose and hemicellulose. The components of juice cloud have varying particulate sizes that range from approximately 2 to 1000 microns. Particulates of larger size tend to settle in the juice over time. This material is commonly referred to as sinking pulp or bottom pulp. Smaller, colloidal particulates remain suspended in the juice and make up what is known as stable cloud.

The citrus industry commonly describes two types of pulp in processing operations, namely sinking pulp and floating pulp, to characterize the quantity of suspended insoluble material in juice. The floating pulp is a wet composition of pulp and juice serum. As an example, this floating pulp can beat a concentration which has a density of on the order to 450 grams per quart of floating pulp composition. Other densities are possible. For example, a more concentrated composition could have a density of 900 grams per quart.

The citrus industry uses a centrifugation method to measure sinking pulp as a volume of fraction of the juice. Typical sinking pulp values in orange juice range from about 5 to about 15 volume percent, typically between about 8 and about 12 volume percent, based upon the total volume of the orange juice. In many juices, the natural sinking solids content is about 12 volume percent, based on the total volume of the juice. Sinking pulp can be referred to by different terms, such as sinking solids. Other terms used in this regard include insoluble solids, bottom pulp and background pulp. Generally speaking, such sinking solids or sinking pulp are made up of insoluble materials and are generally not sensed on the tongue as discrete particles. Generally, the particle sizes of sinking solids are not greater than about 0.5 mm.

Also present in some orange juices is what is known in the industry as floating pulp, which is the pulp that imparts mouth feel to orange juice. Floating pulp does not settle in orange juice and is commonly added to commercial orange juice products to provide a "fresh-squeezed" appeal. Such floating pulp typically is distinguished from the sinking pulp or sinking solids phase or component discussed herein.

In a typical orange juice extraction process, the orange fruit is mechanically squeezed or reamed. Rag and seeds are removed. This mixture of pulp and juice often is clarified by a so-called finisher, which separates the pulp from the juice by means of a sieve mechanism. This pulp stream then is recovered for floating pulp usage. The juice stream coming out of the finisher apparatus contains the sinking pulp or sinking solids, which are too small to be captured by the finisher sieve. This is a typical freshly extracted whole juice source. Pasteurization will normally be carried out within a few hours of extraction and preferably no later than about a day thereafter.

In accordance with a preferred embodiment of the present invention, the floating pulp is processed to provide a source of sinking pulp, bottom pulp or sinking solids. Alternatively, when processing procedures permit, the sinking pulp can be separated from the whole juice to provide the source of sinking pulp. In those situations where floating pulp is to be used in providing the sinking pulp, it is subjected to size reduction treatment to transform it into a source of sinking pulp. When desired during processing, the floating pulp and/or sinking pulp can be pasteurized and stored, or used immediately in making up the beverage. When stored, preferably such will be under generally chilled conditions, such as at less than 5° C. (for example about 35° F.) until needed for use in making up beverages according to the invention.

When the sinking pulp component of the invention is prepared from floating pulp, the preferred mechanism for such preparation is to subject the floating pulp to homogenization conditions. The homogenization or particle size reduction can proceed either before the floating pulp is added to the beverage composition, or after same is added to the entire beverage composition or a partially prepared composition. Because energy is required for this procedure, and because some of the components could exhibit better properties if not subject to such conditions, particle size reduction (when practiced) of floating pulp sources into sinking pulp preferably is carried out on the floating pulp alone.

Homogenization equipment is well known in the art, and such equipment is suitable for carrying out the homogenization procedure. Examples are homogenization equipment from APV and equipment known under the Tetra name. Most homogenization equipment has a pressure setting. Suitable homogenization of the floating pulp into sinking pulp can be carried out at pressures ranging, for example, between about 2000 psi and about 2800 psi (between about 13.8 MPa and about 19.3 MPa). A preferred range is between about 2000 psi and about 2500 psi (between about 13.8 MPa and about 17.2

MPa). An especially preferred pressure for typical APV equipment is about 2250 psi (about 15.5 MPa). One psi is equal to 6.9 KPa.

However the sinking pulp is provided, it contains materials of value in achieving the objectives of the invention. The citrus juice stream which provides the ultimate source of the sinking pulp contains a complex mixture of volatile aroma compounds that vary as a result of numerous factors. These factors include the particular cultivar from which the juice originated, the maturity level of the harvested fruit, fruit processing conditions, and fruit and juice handling and storage conditions. Major classes of compounds which are involved in orange juice flavor and aroma characteristics are alcohols, aldehydes, esters and hydrocarbons. These compounds exist in the peel and/or the juice of the whole orange fruit. Compounds from the peel, which often are referred to as peel oil, typically are the hydrocarbons and aldehydes which are not water-soluble. For example, limonene is the major constituent of orange peel oil, typically accounting for greater than 90% of its volume.

Compounds originating from the juice of the raw citrus fruit fall into two general categories. One is so-called essence oil, which contains mainly limonene. The other major type is essence aroma, and this contains water-soluble compounds.

The art generally has recognized that there is a relationship between sinking pulp and aroma and flavor compounds. Hydrocarbons such as limonene, alpha-pinene, sabinene, mycrene and valencene are found almost exclusively in the pulp. The juice serum typically holds almost all of the esters, alcohols and aldehydes. Laboratory work associated with this invention has shown that the various classes of the volatile aroma compounds of orange juice are specifically associated with the serum phase or with the pulp phase of the orange juice. According to these findings, alcohols and esters are found primarily in the serum phase, while aldehydes, ketones and hydrocarbons were determined to be associated with the sinking solids or sinking pulp phase. Also present are finely sized solids that assist in texture characteristics according to the invention.

The quantity of sinking pulp incorporated into beverages according to the invention is the amount which adds enough of these types of compounds found in sinking pulp, as well as the texture-imparting characteristics. In a typical beverage according to the invention, this sinking pulp quantity of the pulp compositions discussed herein is between about 3 weight percent and about 20 weight percent of sinking pulp, based on the total weight of the beverage composition. Preferably, this is between about 5 weight percent and about 15 weight percent of the beverage composition, most preferably between about 7 and about 12 weight percent, based on the total weight of the beverage composition.

Concerning the juice component of the beverages according to the invention, it is a source of whole citrus juice. This juice component can be a not-from concentrate juice source. The Brix or soluble solids, primarily sugars, content of this citrus juice component can vary somewhat depending upon the source. Usually from-concentrate sources can be selected to be at a desired Brix level. Not-from-concentrate citru juice sources tend to have Brix variability which is not so easily controlled.

A typical not-from-concentrate whole orange juice component from in-season fruit would have a Brix on the order of about 11.5° to about 12°. A typical whole grapefruit juice component from in-season fruit would have a Brix on the order of about 9.5° to about 10.5° Brix. These are typical Brix levels when the citrus juice component (of whatever type) is to be diluted in accordance with the invention. In such instances when the citrus juice component has a given Brix level of at least about 9° Brix, the amount of the citrus juice component is between about 20 and about 80 weight percent, based on the total weight of the beverage composition, preferably between about 40 and about 65 weight percent, most preferably between about 45 and about 60 weight percent, based on the total weight of the beverage composition. An especially preferred range is between about 48 and about 56 weight percent of the citrus juice component in the beverage composition.

With reference to the diluting aspect of the invention, when a citrus juice component having a Brix level characteristic of whole juice from in-season fruit, such as between about 11.5° and about 12° Brix for whole orange juice, will have its soluble solids level reduced by incorporating a diluent into the beverage composition. The diluent is to add no significant level of sugars to the beverage. It also should be dechlorinated (if needed) and free of microbial contamination. For economic and ready availability reasons, water is the preferred diluent. When a water diluent is incorporated under the conditions noted herein, it is included at a level of between about 20 and about 55 weight percent, preferably between about 30 and 40 weight percent, based on the total weight percent of the beverage composition. An especially preferred level is between about 34 and about 38 weight percent of the beverage composition.

Whatever diluent is used, when combined with the whole citrus juice component, the combined Brix level and sugar or caloric levels within the beverage composition is reduced by as much as about 70 percent from that of the whole citrus juice. The target lower Brix level is dependent upon the amount of caloric load reduction which is desired for a particular beverage. This beverage Brix level typically is between about 6° and about 9° Brix for orange juice, preferably between about 7° and about 8° when the target caloric load reduction is at about one-third less than whole orange juice when the orange juice component is between about 11° and about 12° Brix. For grapefruit juice the Brix level will be between about 5° and about 8° Brix, preferably between about 6° and about 7° Brix, for a juice beverage having a one-third reduction in caloric load when the grapefruit component is between about 10° and about 11° Brix. It will be appreciated that these Brix levels of the beverage composition also will be a function of the Brix and quantity of the citrus juice component added to the beverage and of the sinking pulp component, as well as of the amount of diluent. By the same token, varying such factors allows for a close control of beverage Brix, in accordance with the properties desired for the finished beverage.

When the target caloric load reduction is to be on the order of one half or lower of whole orange juice the Brix can be as low as about 4° Brix. For grapefruit juices, the Brix levels each are lower, and Brix levels can be as low as about 3° Brix when a high caloric reduction is desired.

In those instances where it is possible to have a source of citrus juice component which has a relatively low Brix, then the amount of diluent can be reduced or omitted entirely. In such instances where the citrus juice composition component has a Brix level between about 3° Brix and 9° Brix, the amount of the citrus juice component is between about 30 and 90 weight percent, based on the total weight of the beverage composition. For example, if an adequate quantity of citrus juice component having a Brix in the area of about 7° to about 8° Brix for an orange juice beverage having a one-third reduction in caloric load, the requirements for the beverage being produced could be met without having to further adjust the Brix level in order to reduce sugar amounts and caloric content.

A source of calcium can be included in the beverage composition to provide at least about 5% of the Daily Value. This provides a level of calcium which can be beneficial to consumers, as is generally noted in the art. As such, the calcium will provide a Daily Value, or part of the Daily Value for calcium in a standard diet in accordance with current governmental regulations. An exemplary Daily Value range can be from 10% DV to 50% DV. A typical range is about 20% DV of calcium.

The calcium source itself can be of the type generally known in the art. Calcium malate, calcium carbonate, calcium citrate, calcium phosphate, calcium hydroxide and so-called calcium citrate malate are exemplary. Calcium sources can include incorporating food grade acids such as citric acid, malic acid, phosphoric acid, and the like, which can interact with the calcium source(s) in preparing calcium components. Amounts of compounds added to provide the calcium component typically will be not greater than about 2 weight percent, based on the total weight of the beverage composition, depending upon the calcium source. Typically, these amounts will be between about 0.1 and about 0.7 weight percent, preferably not more than about 0.5 weight percent.

The juice beverage composition will include soluble pectin. A primary source of soluble pectin is the added sinking pulp, especially when it is homogenized from floating pulp. When included, the calcium and pectin are believed to interact within the beverage in forming calcium pectate, which is beneficial in creating the texture properties which are characteristic of the citrus juice beverage composition which emulates whole, full-Brix citrus juice which is 100% juice, as opposed to a juice beverage composition according to the invention. This provides a gelling type of phenomenon which enhances texture and taste without adding a proportional caloric or sugar load to the beverage. Such a thickening type of action is achieved without having to add gums such as carageenan, although added gums can be included if desired.

Because the Brix level provided primarily by the combination of the citrus juice component, the diluent, and to a lesser extent the sinking pulp or suspended solids, sweetener levels are lower than an typical whole juice. In order to achieve a taste profile mimicking whole juice products, a sweetener usually is added. Of course, the sweetener cannot add a substantial caloric load; otherwise, the low sugar and low calorie feature will be sacrificed. Thus, so-called artificial or non-nutritive sweeteners are preferred. These include sucralose, aspartame, and numerous compounds well known in the art. Because of its especially advantageous absence of unpleasant aftertaste, sucralose is preferred. Other such low-calorie or no-calorie sweeteners as might exist or be developed are preferred for the present invention because they avoid unpleasant aftertaste characteristics so prevalent in the artificial sweetener industry at present.

The amount of artificial sweetener will be less than one percent in the case of many of these sweeteners. For example, liquid sucralose percentages can be at a level of between about 0.01 to about 0.5 weight percent, preferably not more than about 0.05 weight percent, and most preferably not more than about 0.03 weight percent, based on the total weight of the beverage composition. Dry sucralose also can be used, which is about 4 times more concentrate than the liquid version. Thus, the dry version can be added at a level of between about 0.0025 and about 0.125 percent if the beverage.

Sucralose is currently available under the name SPLENDA, a registered trademark, from McNeil Nutritionals. It is made from sucrose. It is 4,1',8'-trichlorogalactosucrose. Sucralose is characterized as having a unique combination of hydrophilic and lipophilic portions on its molecule. It has taste characteristics of sugar and has been shown to have a taste which is not perceptibly different from that of sucrose. Its supplier specifies that sucralose has a "clean taste like sugar" and "has no unpleasant aftertaste."

Besides calcium, other minerals can be added, including magnesium, potassium and so forth. Specific examples include magnesium phosphate and potassium citrate. Each can be added at a desired Daily Value level, which can be a DV less than that of added calcium. Exemplary levels of these other minerals can be on the order of 10% DV or less, each typically being not greater than 0.1 weight percent of the beverage composition.

Other ingredients include nutrient mixes, flavor add back or oil add back compositions. Included additions are ascorbic acid as a vitamin C source and beta-carotene as a color enhancer. A typical nutrient mix will include thiamin, niacin, B vitamin(s), riboflavin, and the like. Each can be added at levels for achieving the quantity of nutrient to be delivered by the beverage, as generally known in the art.

Tocopherol can be added. Preferably this involved the addition of a tocopherol other than an alpha-tocopherol as a flavor antioxidant. This helps to maintain superior flavor and sensory attributes of the citrus juice of the beverage. The tocopherol additive or composition performs as a flavor preservative antioxidant. Preferably, the tocopherol composition includes at least one tocopherol other than alphatocopherol. Such tocopherols are oil soluble antioxidants. They have been found to enhance or maintain sensory attributes of the citrus juice of these compositions.

Preferably, the tocopherol composition is in liquid form and is comprised of one or more tocopherol other than alpha-tocopherol. In a further embodiment, the tocopherol composition is a mixed tocopherol of two or more tocopherols. In a still further embodiment, the mixed tocopherols include no more than approximately 20 weight percent of alphatocopherols.

The tocopherol composition is incorporated into the citrus juice beverage at a level of at least about 40 ppm tocopherol, and typically not more than about 1300 ppm. Preferably, the tocopherol composition is added to the juice beverage at levels between about 50 ppm and about 500 ppm, and most preferably between about 100 ppm and about 200 ppm.

The citrus juice beverage composition having such tocopherol sources exhibit better flavor maintenance for storage of the juice beverage over prior products and help to maintain sensory attributes such as the fresh orange and raw orange flavor in the stored juice beverage. The citrus juice beverage composition having the tocopherol component provide a citrus juice having a better initial flavor than juice with other natural antioxidants added thereto.

The tocopherol additive or composition is preferably made up of some combination of beta, gamma and/or delta tocopherol isomers, with a lesser amount of alpha-tocopherols (when present). The high content of non-alpha-tocopherols in the tocopherol composition provides a strong anti-oxidant effect. Preferably, the alpha-tocopherols, when present, comprise between 0 to 20 weight percent of tocopherol additive. Depending upon the goals of the citrus juice manufacturer, the amount of any alpha-tocopherol can be varied. More specifically, if a higher amount of antioxidant activity is desired and Vitamin E enrichment is not a concern, then less alpha-tocopherol is used in the tocopherol composition added to the juice. In contrast, if Vitamin E enrichment is a concern or goal, then a higher amount, approaching the 20 weight percent limit, of alpha-tocopherols could be used in the tocopherol composition, as the alphatocopherols provide supplemental Vitamin E fortification. This level of alpha-tocopherol inclusion in the beverage can be supplemental to any other Vitamin E addition to achieve the Vitamin E RDV, for example.

Presently, when producing the tocopherol composition, an edible oil by-product remains in the composition. A maximum amount of 80 weight percent of edible oil in the tocopherol composition is acceptable for addition to the juice beverage. Examples of such edible oils include soybean oil, corn oil, safflower oil and sunflower oil. Generally, most so called domestic oils are acceptable for addition to the juice within the tocopherol additive composition. Preferably, no emulsifying agents are included in the tocopherol additive. Oil content ranges from about 20 to about 80 weight percent, preferably between about 25 and about 70 weight percent. An especially preferred content is about 30 weight percent.

An example of such a mixed tocopherol composition is Covi-ox®. T-70 from Cognis Corporation of LaGrange, Ill. This mixed tocopherol composition is made of approximately 14 weight percent d-alpha-tocopherol, 2 weight percent d-beta tocopherol, 60 weight percent d-gamma-tocopherol and 24 weight percent d-delta-tocopherol. The percentages are as a weight percent of the total weight of tocopherols. The manufacturer guarantees a minimum of 560 mg of non-alpha-tocopherols in 700 mg of total tocopherols in each gram of Covi-ox® T-70 (i.e. at least approximately 80 weight percent of non-alphatocopherols). This tocopherol additive composition also includes edible oil. Other sources and other blends of mixed tocopherol compositions can also be used which have similar relatively low, or lower alpha-tocopherol levels, or do not contain alpha-tocopherols beyond possible trace amounts.

Preferably, the tocopherol antioxidant composition is added either directly to the juice beverage, or added after premixing with a citrus oil composition in an otherwise conventional oil add-back step. Preferably, between about 40 ppm and about 1300 ppm of tocopherol(s) are added to the beverage. It has been found that the tocopherol composition of the present invention stays suspended in the citrus juice or citrus juice beverage without ringing. The tocopherol composition can be added to the juice or oil by, for example, blending with a high shear mixer.

The use of an oil-soluble tocopherol composition was not expected to benefit a water based product such as citrus or orange juice or beverages containing same because tocopherols are oil soluble. It had been expected that tocopherol added to juice would float to the surface of the juice and render the tocopherol ineffective against dissolved oxygen in the product. However, this is not the case.

Regarding the process by which the beverage composition can be prepared, one approach is to combine all of the components and then homogenize the mixture, typically at a level of between about 2300 and about 2800 psi. Pasteurization then follows, if not already pasteurized. If calcium is included, typically relatively high shear is needed, and if a gum is added, it should be first hydrated with water using shear also.

In a preferred process, if floating pulp is to be homogenized into sinking pulp, between about 2 and about 5 weight percent, wet weight, of floating pulp is homogenized as noted herein. This then is combined with the other components under low-shear mixing, such as through a recirculation loop unit, paddle mixer or the like. This combining approach does not further break down the sinking pulp. Pasteurization then proceeds, if not previously undertaken.

The amount of sinking pulp or bottom solids in the sinking pulp component prior to addition to the beverage, and the amount of sinking pulp in the finished beverage can be determined by known methods. Such are set out, for example, in Citrus Science and Technology, pages 508-510, Ed. Nagy, et al, 1977, which also contains information on floating pulp as well as on suspended solids pulp, or sinking pulp. This reference is incorporated by reference hereinto.

In measuring the amount of sinking pulp, the material to be measured is poured through a 20 mesh screen, with optional shaking. The temperature is brought to 80 F. water bath. Two short conical 50 milliliter centrifuge tubes are filled with the sample, and centrifuging is carried out. For a 11½ inch centrifuge, the speed is set at 1500 rpm and continues for 10 minutes. The quantity then is observed.

Using this type of measurement method, the sinking pulp content of the citrus whole juice component is between about 8 weight percent and about 18 weight percent. More typically, the amount is between about 11 and about 12 weight percent, most typically at 11.4 weight percent or above for orange juice. The sinking pulp in the beverage composition can typically be between about 12 and about 15 weight percent and as high as about 17 weight percent, usually between about 13 and about 14 weight percent, most preferably at about 13.5 weight percent.

Exemplary illustrations of the disclosure herein are provided in the following Examples. These include testing illustrating various options for embodying the principles discussed herein.

Example 1

An orange juice beverage composition was prepared to mimic a typical whole orange juice. This orange juice beverage was formulated to have a Brix of 7.7° and a calcium addition which provides a 10% DV level. The whole juice component was not-from-concentrate (NFC) orange juice having a Brix of 11.8° and an acidity of 0.56%. This was added at a level of about 53.5 weight percent. Also added was about 36 weight percent of dechlorinated, clean water, along with 10 weight percent of wet floating pulp at a density of about 450 grams per quart. Calcium was added at a level of about 0.2 weight percent, and ascorbic acid was added at a level of about 0.03 weight percent. Liquid sucralose was added at a level of about 0.02 weight percent, and beta-carotene (1%) was added at a level of about 0.02 weight percent. All of these percentages are based upon the total weight of the beverage formulation. Also included was a typical level of flavor and oil add back, as well as a nutrient package to provide 5.2% DV potassium, 2.4% DV magnesium, along with thiamin, niacin, and vitamin B6.

This formulation was homogenized within an APV homogenizer, and the homogenization was adequate to shear the calcium for adequate incorporation into the composition, while also transforming the floating pulp into sinking pulp. The formulation was made under chilled conditions at about 35° F.

Evaluation of the finished beverage product indicated good taste and a texture which simulates that of the 100% whole orange juice component. The product, however, had about ⅓ fewer calories and ⅓ less sugar than the otherwise comparable 100% whole juice component.

Example 2

Another orange juice beverage composition was prepared to have a reduced caloric load while exhibiting taste, sensory properties, texture and mouth feel favorably comparable to that of 100% whole orange juice. This formulation contained about 9.7 weight percent of orange juice concentrate having a Brix of 65°. Dechlorinated water was added at a level of about 80 weight percent, based upon the total weight of the formulation. Also included was about 10 weight percent of wet floating pulp in juice liquid which had a density of about 450 grams per quart or a wet weight of between 2 and 5 percent. Calcium hydroxide was added at a level of about 0.08 weight percent, as was a malic acid and citric acid premix at a level of about 0.13 weight percent. The other components were added as specified in Example 1.

The water addition level was such that the orange juice concentrate and water made up a from-concentrate orange juice having a Brix of 11.8°. The finished orange juice beverage had a Brix of 7.7°. This formula supplied 10% DV of calcium. It tested favorably, exhibiting properties as in Example 1.

Example 3

Another orange juice beverage was prepared incorporating a not-from-concentrate orange juice having a Brix of 11.8°. This NFC was added at about 53.5 weight percent, and about 36 weight percent water was added, as well as about 100 of the wet floating pulp component. The calcium and food-grade acid components were added at levels noted in Example 2.

All of the other components were added as noted in Example 1. After homogenization, the beverage had a Brix of 7.7° and a calcium level of 10% DV. The NFC juice component had been analyzed to have a sinking pulp or bottom solids content of 11.4%. The final beverage had a sinking solids or bottom pulp content of 13.5 weight percent. The sensory, taste, mouth feel and texture characteristics of this finished product mimicked those of a good whole orange juice having a full caloric load and a Brix of about 11.8°.

Example 4

An orange juice beverage was prepared generally according to the formulation of Example 3. However, the wet floating pulp component was homogenized prior to incorporation into the rest of the formulation. Thus, the sinking pulp component was the pulp additive. In addition, the calcium level was doubled, and the beverage had 20 DV of calcium. Also, dry sucralose was added, at a level of 0.005 weight percent. The formulation then was blended into a final product by mixing through a recirculation loop using the equipment well known in the art. The resulting product had characteristics consistent with those of Example 3 while having 20 DV calcium.

Example 5

A composition of mixed tocopherols in soybean oil is added to 2.6 grams of orange oil (a commercially used oil addback composition containing natural orange oil). The tocopherol component is added at tocopherol levels of 250 and 500 ppm (i.e. 400 and 700 ppm with edible oil included). The thus prepared tocopherol-containing oil add-back compositions then are added to 52.3 pounds of orange juice beverage as prepared in accordance with Example 1. A high fresh flavor is retained in the tocopherol treated beverage. Ringing is not observed. This beverage composition provides better flavor maintenance than stored juice with no antioxidant added to the juice and with no negatives such as ringing or negative effects on flavor or specific sensory qualities due to the tocopherol additive.

Example 6

The tocopherol compositions which can be included in the present beverage compositions were tested for initial flavor in orange juice against the taste of other natural antioxidants in orange juice. In particular, a tocopherol composition according to the present invention (namely Covi-ox® T-70), ascorbic acid, rosemary extract (lipid soluble and water soluble) and peel paste (ground up orange peel), which are all natural antioxidants, were added to juice and tested for initial flavor. The results are shown in the following Table.

TABLE

|  | Control | Tocopherol 500 ppm | Oil Soluble Rosemary Extract | Water Soluble Rosemary Extract | Peel Paste | Ascorbic Acid |
|---|---|---|---|---|---|---|
| Total Orange | 4.3 b | 5.0 a | 4.6 b | 4.5 b | 4.5 b | 4.3 b |
| Raw Orange | 0.5 b | 1.3 a | 0.5 b | 0.6 b | 0.6 b | 0.5 b |
| Cooked Orange | 2.0 a | 1.4 b | 1.9 a | 1.9 a | 1.8 a | 1.9 a |
| Orange Oil | 1.1 bc | 1.3 ab | 0.9 b | 1.1 bc | 1.2 abc | 1.4 a |
| Other Citrus | 0.2 c | 1.0 a | 0.3 bc | 0.6 b | 0.4 bc | 0.9 a |
| Sweet | 5.4 b | 5.7 a | 5.7 a | 5.4 b | 5.4 b | 5.3 b |

As shown in the Table, the tocopherol composition had a statistically significant positive effect on total orange, raw orange, and cooked orange flavor notes. The tocopherol composition also increased other citrus and sweet scores, while attaining a low sour score.

It will be understood that the embodiments of the present invention which have been described are illustrative of some of the applications of the principles of the present invention. Numerous modifications may be made by those skilled in the art without departing from the true spirit and scope of the invention.

The invention claimed is:

1. A citrus juice beverage composition comprising:
   from about 40 to about 65 weight percent of a whole citrus juice component, based upon the total weight of the juice beverage, said whole citrus juice component having a given Brix level of at least about 9° Brix;
   from about 12 to about 17 weight percent, based upon the total weight of the juice beverage, of a sinking pulp component originating from a citrus juice;
   from about 30 to about 40 weight percent of a diluent to lower the given Brix level to between about 3° and about 9° Brix;
   a sweetener which does not add a significant caloric load to the beverage; and
   said beverage has a Brix level of between about 3° and about 9° Brix while having sensory and texture attributes, including mouth feel and taste profile, comparable to those of said whole citrus juice component having its given Brix level.

2. The citrus juice beverage according to claim 1, wherein said sweetener is sucralose.

3. The citrus juice beverage according to claim 1, wherein said whole citrus juice component is orange juice, said Brix level of the beverage is between about 7° and about 8° Brix, and the beverage has a sugar level which is two thirds of that of the orange juice.

4. The citrus juice beverage according to claim 1, wherein said whole citrus juice component is orange juice, and said given Brix level of the whole citrus juice component is between about 11° and about 12° Brix.

5. The citrus juice beverage according to claim 1, wherein said whole citrus juice component is grapefruit juice, said Brix level of the beverage is between about 6° and about 7° Brix, and the beverage has a caloric load which is two thirds of that of the grapefruit juice.

6. The citrus juice beverage according to claim 1, wherein said whole citrus juice component is grapefruit juice, and said given Brix level of the citrus juice component is between about 10° and about 11° Brix.

7. The citrus juice beverage according to claim 1, wherein said sinking pulp component is homogenized floating citrus pulp.

8. The citrus juice beverage according to claim 1, further including a tocopherol component incorporated into the juice beverage at a level of between about 40 ppm and about 1300 ppm.

9. The citrus juice beverage according to claim 1, further including a calcium component at a level of not greater than about 2 weight percent, based on the total weight of the juice beverage.

10. The citrus juice beverage according to claim 1, further including a calcium component added at an amount to provide at least about 5 DV of calcium in the beverage.

11. The citrus juice beverage according to claim 10, wherein said calcium component interacts with pectin from the sinking pulp to provide calcium pectate in the beverage.

12. The citrus juice beverage according to claim 11, wherein the source of the pectin is homogenized sinking pulp.

13. A process for preparing a citrus juice beverage composition comprising:

combining from about 40 to about 65 weight percent of a whole citrus juice component, based upon the total weight of the juice beverage, said whole citrus juice component having a given Brix level of at least about 9° Brix, from about 12 to about 17 weight percent, based upon the total weight of the juice beverage, of a sinking pulp component originating from a citrus juice, from about 30 to about 40 weight percent of a diluent to lower the given Brix level to between about 3° and about 9° Brix, and a sweetener which does not add a significant caloric load to the beverage; and homogenizing the resulting combination, whereby a beverage is produced which has a Brix level of between about 3° and about 9° Brix while having sensory and texture attributes, including mouth feel and taste profile, comparable to those of said whole citrus juice component having its given Brix level.

14. A process for preparing a citrus juice beverage composition comprising:

homogenizing from about 12 to about 17 weight percent, based upon the total weight of the juice beverage, of a floating pulp into a sinking pulp component originating from a citrus juice;

combining said sinking pulp component with from about 40 to about 65 weight percent of a whole citrus juice component, based upon the total weight of the juice beverage, said whole citrus juice component having a given Brix level of at least about 9° Brix, about 30 to about 40 weight percent of a diluent to lower the given Brix level to between about 3° and about 9° Brix, and a sweetener which does not add a significant caloric load to the beverage; and said beverage thus produced has a Brix level of between about 3° and about 9° Brix while having sensory and texture attributes, including mouth feel and taste profile, comparable to those of said whole citrus juice component having its given Brix level.

* * * * *